United States Patent

Schwarz

[11] Patent Number: 5,988,263
[45] Date of Patent: Nov. 23, 1999

[54] MIXING DEVICE FOR AIR CONDITIONING SYSTEM

[75] Inventor: Stefan Helmut Schwarz, Rochester Hills, Mich.

[73] Assignee: Valeo Climate Control, Inc., Rochester Hills, Mich.

[21] Appl. No.: 08/889,247
[22] Filed: Jul. 8, 1997
[51] Int. Cl.[6] ....................................................... F28F 1/00
[52] U.S. Cl. .................. 165/41; 165/42; 165/43; 165/903; 165/103; 454/121; 454/261; 454/269
[58] Field of Search ........................ 165/41, 42, 43, 165/903, 103; 454/121, 261, 156, 269

[56] References Cited

U.S. PATENT DOCUMENTS

| | | | |
|---|---|---|---|
| 4,616,693 | 10/1986 | Dietzsch et al. | 165/41 |
| 4,852,639 | 8/1989 | Horiguchi et al. | 165/103 |
| 5,062,352 | 11/1991 | Ostrand | 454/121 |
| 5,101,883 | 4/1992 | Kinmartin et al. | 165/42 |
| 5,217,405 | 6/1993 | Tanaka | 454/121 |
| 5,305,823 | 4/1994 | Elliot | 165/42 |
| 5,368,521 | 11/1994 | Koenig | 454/261 |
| 5,463,967 | 11/1995 | Gielow et al. | 454/261 |
| 5,476,418 | 12/1995 | Loup | 454/121 |
| 5,518,449 | 5/1996 | Danieau | 454/121 |
| 5,676,595 | 10/1997 | Sumiya et al. | 454/121 |

FOREIGN PATENT DOCUMENTS 1044-926  9/1983  Greece .................................. 454/261

Primary Examiner—Ira S. Lazarus
Assistant Examiner—Terrell McKinnon
Attorney, Agent, or Firm—Morgan & Finnegan LLP

[57] ABSTRACT

An air flow mixer structure for a vehicle air conditioning system has a first conduit for a first air flow, a second conduit for a second air flow, an opening between said first and second conduits for merging said first and second air flows in a merging region and a common air channel for said merged air flows, the mixer structure having an air inlet region and an air outlet region opening into said merging region, the structure comprising plural air passages disposed between said inlet region and said outlet region for dividing an air flow at said inlet region into plural air flows at plural said openings into said merging region.

8 Claims, 4 Drawing Sheets

MIXING DEVICE FOR AIR CONDITIONING SYSTEM

FIELD OF THE INVENTION

The present invention relates to the field of air conditioning systems, and more specifically but not specifically to air conditioning systems for vehicles.

BACKGROUND TO THE INVENTION

Vehicle air conditioning systems are well known in the art. Such systems conventionally include an air duct, which is selectively connected to the external air or to the interior of the vehicle cabin, a fan for causing the air to flow, and an evaporator unit within the duct for cooling the air. The cold air output from the evaporator unit may be supplied directly to various outlets within the vehicle cabin or some of the cold air may be passed through a heating heat exchanger whose heated air output is mixed with the cold air to provide temperature control of the air output to the cabin. Diversion of the cold air through the heat exchanger is controlled by a so-called "blend door", which in one extreme position causes all of the cold air to flow through the heat exchanger and in the opposite extreme position causes none of the air to flow through the heat exchanger. In intermediate positions different proportions of cold air and heated air can be provided.

As will be seen in FIG. 1, the cold air flow 22 is concentrated on one side of the air duct and the hot air 21 to the other side.

In modern vehicles, there are a number of air outlets into the vehicle cabin and these outlets are connected to the air duct by a corresponding number of output ducts. Two such ducts are shown in FIG. 1. As will be seen with reference to FIG. 1, a first upper duct 41 is disposed on the side of the system which will tend to provide cold air and the second lower duct 42 is disposed on the side of the system which will tend to provide hot air.

It is desirable to be able to provide air outlets which are all at substantially similar temperatures. This may not be possible in the prior art arrangements due to the above-mentioned spatial distribution of air temperature within the air conditioning system.

OBJECT OF THE INVENTION

It is an object of the present invention to provide improved mixing of hot and cold air at the output of an air conditioning system.

SUMMARY OF THE INVENTION

According to a first aspect of the invention there is provided an air flow mixer structure for a vehicle air conditioning system having a first conduit for a first air flow, a second conduit for a second air flow, an opening between said first and second conduits for merging said first and second air flows in a merging region and a common air channel for said merged air flows, the mixer structure having an air inlet region and an air outlet region opening into said merging region, the structure comprising plural air passages disposed between said inlet region and said outlet region for dividing an air flow at said inlet region into plural air flows at plural said openings into said merging region.

Preferably a total area of said air outlets is less that a total area of said inlet region, such that the speed of air flow is greater at said openings than in said inlet region.

According to a second aspect of the invention there is provided a vehicle air conditioning system having a heat exchanger disposed in a first conduit for providing a first heated air flow, a second conduit for a second air flow, an opening between said first and second conduits for merging said first and second air flows in a merging region, a common air channel for said merged air flows and a mixer structure, the mixer structure having an outlet opening into said merging region, and further having an air inlet, said air inlet receiving said first heated air flow, the structure comprising plural air passages opening at plural openings into said merging region for dividing said first heated air flow at said inlet region into plural air flows into said merging region, whereby said first heated air flow and second air flow mix in said merging region.

According to a third aspect of the invention there is provided a vehicle air conditioning system having a heat exchanger disposed in a first conduit for providing a first heated air flow, a second conduit for a second air flow, an opening between said first and second conduits for merging said first and second air flows in a merging region, a common air channel for said merged air flows, and a mixer structure, the mixer structure having a first and a second air inlet region and an air outlet region opening into said merging region, the structure comprising plural air passages connecting said inlet regions and said outlet region for dividing air flows at respective inlet regions into plural air flows at plural openings into said merging region, said structure being disposed in said first conduit and second conduit such that said first heated air flow is applied to said first inlet region, said second air flow is applied to said second inlet region and said outlets open into said merging region.

According to a fourth aspect of the invention there is provided an air flow mixing device having a first inlet region, a second inlet region, and an outlet region, the mixing device comprising plural wall portions defining a plurality of first air passages running between said first inlet region and said outlet region and a plurality of second air passages running between said second inlet region and said outlet region, each of said first air passages being intercalated between a respective pair of said second air passages, whereby in said outlet region, a first air flow applied to said first inlet region is mixed with a second air flow applied to said second inlet region.

Advantageously each of the second air passages is intercalated between a respective pair of first air passages, whereby said first and second air passages alternate.

Conveniently plural first bridge portions bridge alternate contiguous pairs of wall portions, and plural second bridge portions bridge the remaining contiguous pairs of wall portions.

Conveniently said wall portions have a first edge region defining a first inlet port for said first air flow and a second edge region defining a second inlet port for said second air flow, said first bridge portions being disposed in said second edge region and said second bridge portions being disposed in said first edge region.

Conveniently said first and second edge regions are substantially mutually perpendicular.

Preferably said wall portions are substantially right-angle triangles, having hypotenuse edges defining outlet ports for said first and second air flows into said outlet region.

According to a fifth aspect of the invention there is provided a vehicle air conditioning system having a heat exchanger disposed in a first conduit for providing a first heated air flow, a second conduit for a second air flow and an air flow mixing device having a first inlet region, a second inlet region and an outlet region, said first inlet region receiving in use said first heated air flow and said second inlet region receiving in use said second air flow, the mixing device comprising plural wall portions defining a plurality of first air passages running between said first inlet region and said outlet region and a plurality of second air passages running between said second inlet region and said outlet region, said first air passages alternating with said second air passages, whereby in use said first heated air flow is mixed in said outlet region with said second air flow.

DESCRIPTION OF THE PREFERRED EMBODIMENTS

Figure 1:
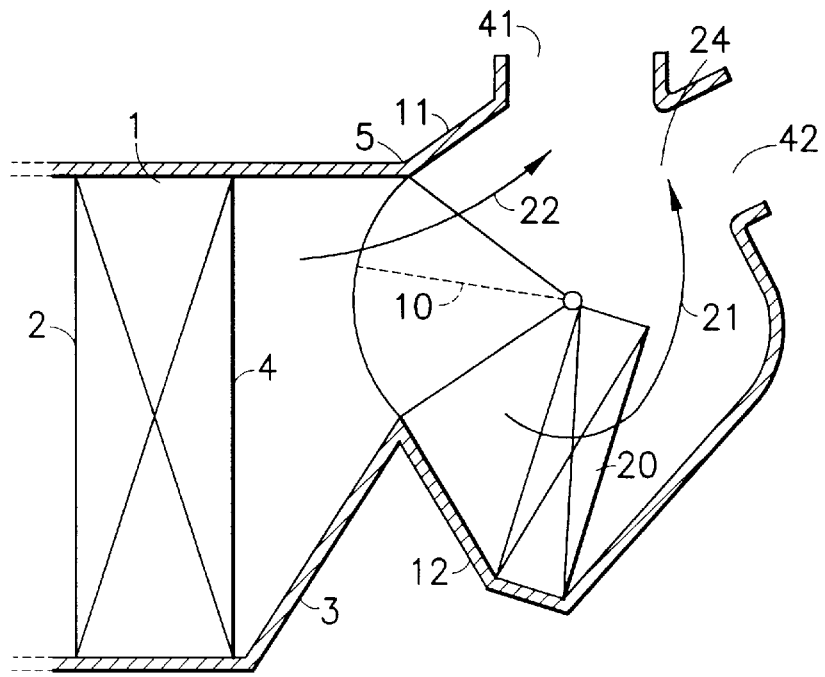
FIG. 1 shows a cross-sectional view through a known vehicle air conditioning system.

In the Figures like reference numerals refer to parts.

Referring first to FIG. 1, an evaporator unit 1 has an input side 2. Air is urged into the input side 2 of the evaporator 1 by the movement of a vehicle in which the air conditioning system is mounted, or by a fan (not shown). The evaporator 1 is disposed in an air duct 3 and the evaporator has an output side 4 from which emerges cooled air. The output duct 3 extends to a throat portion 5 which co-operates with a blend door 10. The blend door as shown in FIG. 1 is in a central position so defining, with one wall of 11 of the duct 3 a first conduit for cold air flow and, defining with the opposite wall 12 of the duct 3 a second conduit for air which will be heated. The second conduit leads to a heat exchanger core 20 which is supplied with hot water, for example from the engine of the vehicle, and which has an output side from which emerges a flow 21 of heated air. The flow 21 of heated air and a cool air flow 22 from the first conduit come together in a mixing region 24 of the duct 3. Two distribution ducts, 41 and 42 are shown in FIG. 1 and these, as has previously been discussed supply air outlets in different parts of the vehicle cabin, eg. passenger and driver's sides.

It would be understood by one skilled in the art that although some mixing of the hot and cold air flows will take place in the mixing region 24, nonetheless the flow resistance caused by the heat exchanger core 20 will substantially reduce the velocity of the hot air and, as a result, on the extreme left of the duct 3, as seen in the direction of flow, the cold air will predominate and, on the extreme right of the duct 3 as seen in the direction of flow, hot air will dominate. Thus distribution duct 41 is more likely to contain cool air and distribution duct 42 is more likely to carry warm air.

Figure 2:
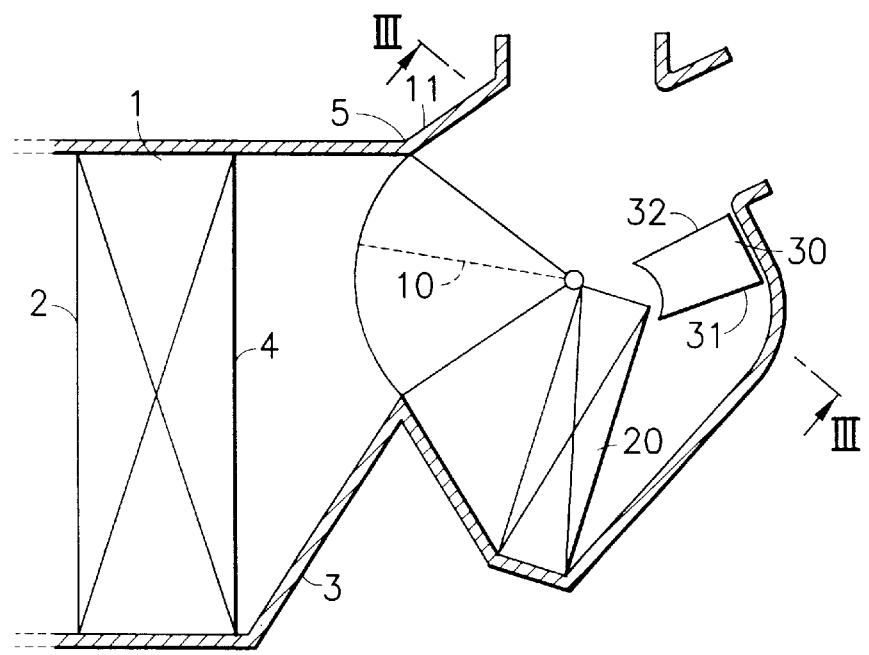
FIG. 2 is a cross-sectional view similar to FIG. 1 through an air conditioning system incorporating the invention.
Figure 3:
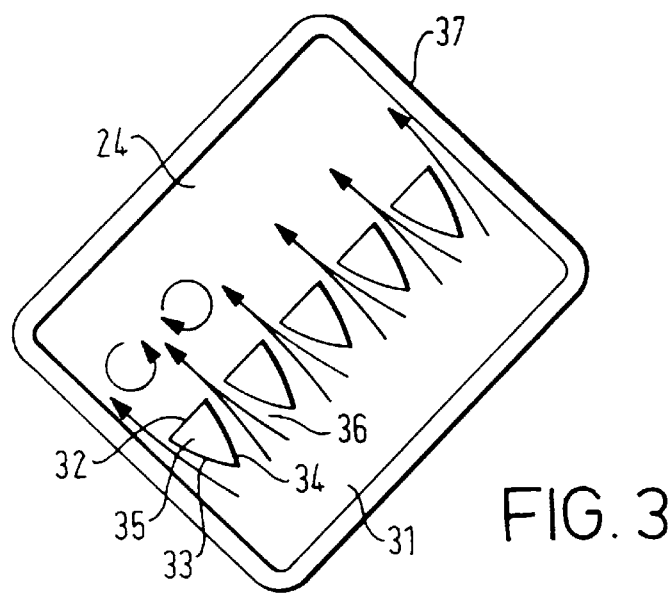
FIG. 3 is a cross-sectional view taken along the line III–III' of FIG. 2.

Referring now to FIG. 2, according to the teachings of the invention, an air flow mixer structure 30 is provided in the second conduit of the air conditioning system, on the downstream side of the heater core. FIG. 3 shows a cross-section through the system along the lines (III)–(III)'. With reference to FIG. 3, the air flow mixer structure has an inlet side 31, which is supplied in use with hot air from the heater core and has an outlet side 32. The air flow mixer structure has a number of walls 33, 34 which define, in this embodiment closed bodies 35 and which in turn define plural air passages 36 between the bodies 35.

Figure 4:
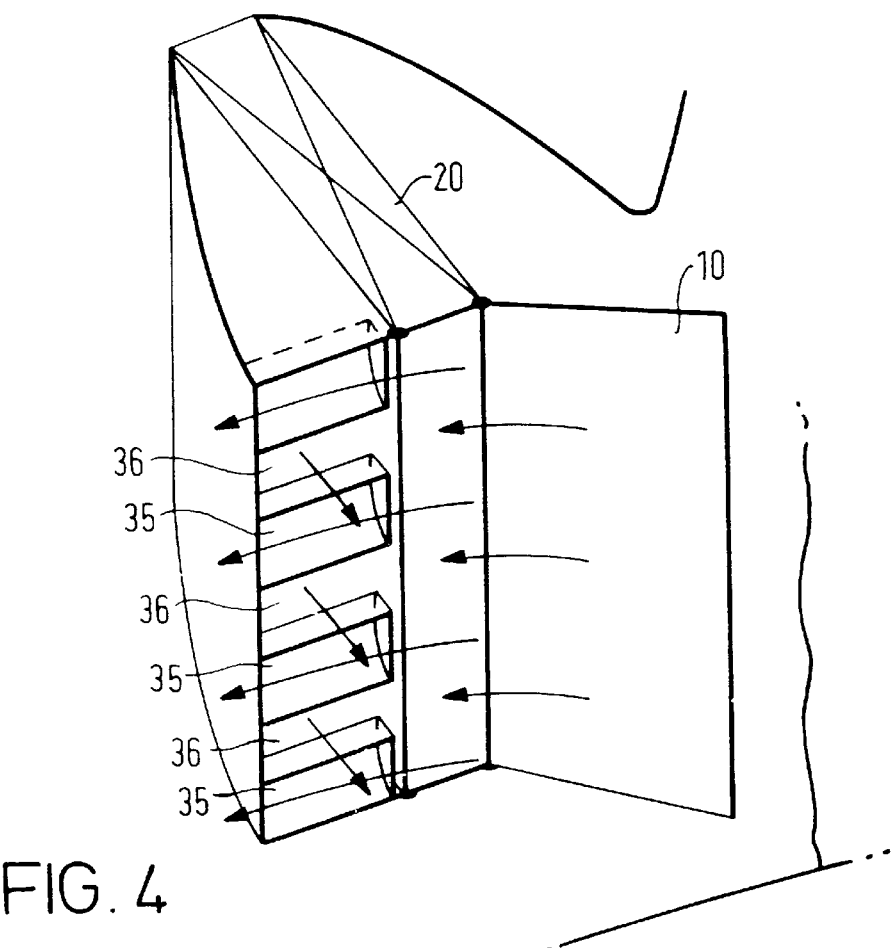
FIG. 4 is perspective view of a first embodiment of an air flow mixing device in accordance with the invention.

In this embodiment, the wall portions 33, 34 define bodies see also FIG. 4 which taper outwardly in the direction of air flow and thus the passages 36 taper down in area between the inlet side 31 and the outlet region 24 of the air flow mixer. As will be seen in FIG. 3, in this embodiment there are five bodies, thus providing, in co-operation with the wall 37 of the duct 3, six passageways 36. The reduction in area for air flow between the inlet side 31 of the flow mixer structure and the outlet side 32 causes the speed of air flow from the outlets to be increased and thus mixing of the rapidly flowing hot air with the cold air is improved.

Figure 5A:
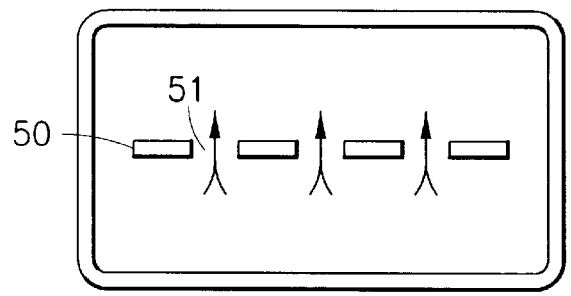
FIG. 5a–5d show four alternative embodiments of air flow mixing devices in accordance with the invention.
Figure 5B:
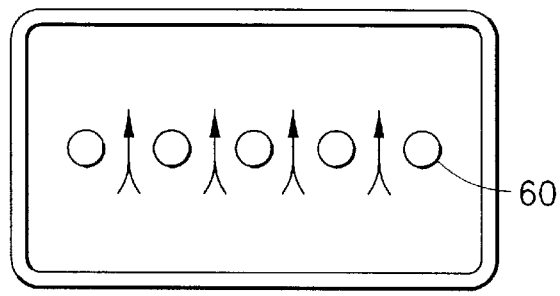
Figure 5C:
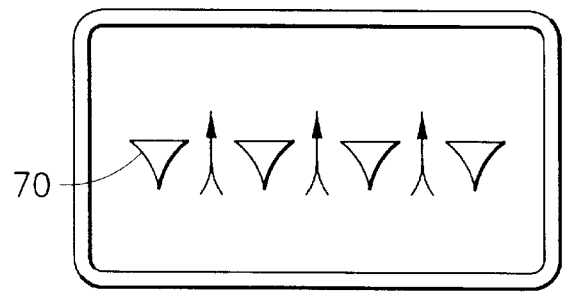
Figure 5D:
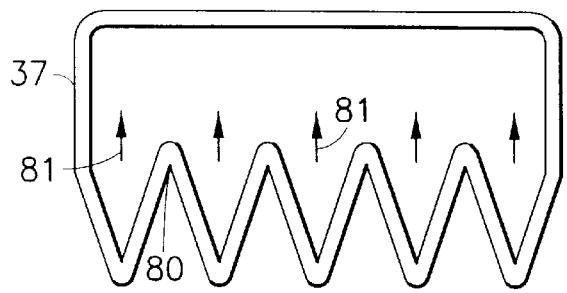

FIG. 5a–d show a number of alternative configurations for the air flow mixer structure. In FIG. 5a, the wall portions of the mixer structure are formed by four rectangular cross-section bars 50 which define therebetween passages 51 whose total cross-sectional area is substantially less than the extent of the hot air flow applied to them. In FIG. 5b, the wall portions are formed by 5 circular cross-section bars 60. In FIG. 5c, the flow mixer is provided by wall portions which define generally triangular cross-section bars 70 and in FIG. 5d the wall 37 of the duct 3 is provided with 4 inwardly projecting portions 80, each having a triangular shape for constricting the air flow, spaces 81 between the projections providing divided flow. It would be understood by one skilled in the art that the number of passages is not limitative. For example, in FIG. 5a, four bars are shown, either fewer or more bars could be used.

In another preferred embodiment of the present invention, both hot and cold air are subjected to flow division so that yet further improved mixing takes place at the output of the flow mixer structure.

Figure 6:
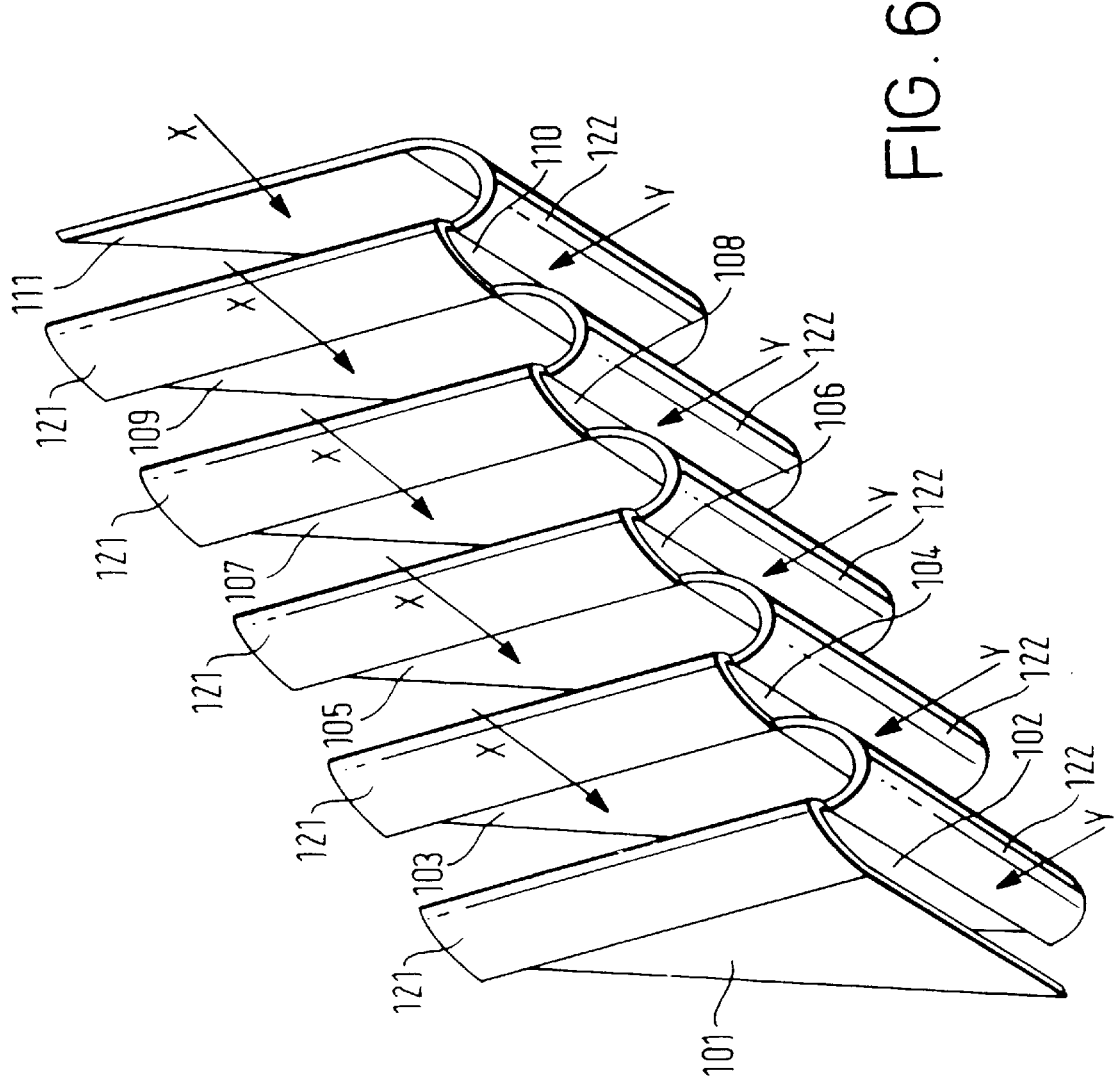
FIG. 6 shows a partial perspective view of a sixth embodiment of an air flow mixing device in accordance with the invention.

Referring to FIG. 6, plural wall portions 101–111 are each shaped as isosceles right angled triangles. The triangles are disposed parallel to one another and in similar orientations to define therebetween a series of passages. The first edges of alternate pairs of the triangles are bridged by first bridging portions 121 and second edges of the intermediate contiguous pairs are bridged by second bridging portions 122. The spaces between the hypotenuse edges of the triangles are not bridged. Air flow in a first direction X impinges on the first bridging portions 121 and is thus prevented from entering the passages formed by the first and second triangles 101, 102, by the third and fourth triangles, 103, 104, by the fifth and sixth triangles 105, 106, the seventh and eighth triangles 107, 108 and the ninth and tenth triangles 109, 110. However, the passages between the second and third, the fourth and fifth, the sixth and seventh, the eighth and ninth and the tenth and eleventh triangles 102, 103; 104, 105; 106, 107; 108, 109; 110, 111 are open to air impinging in the direction X. In contrast, air flowing in the direction Y. which direction is substantially perpendicular to the direction X, is prevented from flowing into the passages between the second and third, the fourth and fifth, the sixth and seventh, the eighth and ninth, and the tenth and eleventh triangles 102, 103; 104, 105; 106, 107; 108, 109; 110, 111 by impinging on second bridging portions 122 disposed therebetween. Air from direction Y can however flow through the passages between the first and second, the third and fourth, the fifth and sixth, the seventh and eighth and ninth triangles 101, 102; 103, 104; 105, 106; 107, 108; 109, 110. It would be understood by one skilled in the art that the triangles need not be right-angled, nor isosceles triangles. Other geometric shapes would be possible in accordance with the geometry of the system. Moreover the wall portions need not be disposed parallel to one another, again depending upon the geometry and the effect sought. It is envisaged that walls could be provided so as to define a tapering passage, for example for the hot air to increase the "nozzle effect".

As applied to a vehicle air conditioning system, the flow mixer structure of FIG. 6 provides an air flow mixing device when disposed such that cold air is incident upon the device in the direction X and hot air is incident upon the device in the direction Y. Each of the pairs of wall portions provides a thin stratified flow of air therebetween and the resulting turbulence on the downstream side of the hypotenuse edges causes mixing of the hot and cold air flows. Temperature equalisation is also assisted by the triangle wall portions which form fins with hot air on one side and cold air on another thus allowing heat exchange across the relatively large fin surfaces.

Although it is envisaged that the structures for mixing air flow will normally be made from plastics material, nevertheless it will also be possible to use metal if this should prove desirable.

I claim:

1. An air flow mixer structure for a vehicle air conditioning system having a first conduit for a first air flow, a second conduit for a second air flow, an opening between said first and second conduits for merging said first and second air flows in a merging region and a common air channel for said merged air flows wherein the mixer structure is disposed in the first conduit for controlling the first air flow, the mixer structure having an air inlet region and an air outlet region opening into said merging region, the mixer structure comprising plural air passages disposed between said inlet region and said outlet region for dividing an air flow at said inlet region into plural air flows at plural said openings into said merging region.

2. The air flow mixer structure of claim 1 wherein a total area of said air outlets is less than a total area of said inlet region, such that the speed of air flow is greater at said outlets than in said inlet region.

3. A vehicle air conditioning system having a heat exchanger disposed in a first conduit for providing a first heated air flow, a second conduit for a second air flow, an opening between said first and second conduits for merging said first and second air flows in a merging region, a common air channel for said merged air flows and a mixer structure disposed in the first conduit for controlling the first heated air flow, the mixer structure having an outlet opening into said merging region, and further having an air inlet, said air inlet receiving said first heated air flow, the structure comprising plural air passages opening at plural openings into said merging region for dividing said first heated air flow at said inlet region into plural air flows into said merging region, wherein said first heated air flow and second air flow mix in said merging region.

4. The vehicle air conditioning system of claim 3 wherein said mixer structure further comprises a plurality of members having a wall wherein each plurality of air passages is formed by the walls of two adjacent members.

5. The vehicle air conditioning system of claim 4 wherein the members have a rectangular cross-section.

6. The vehicle air conditioning system of claim 4 wherein the members have a circular cross-section.

7. The vehicle air conditioning system of claim 4 wherein the members have a triangular cross-section.

8. A vehicle air conditioning system having a heat exchanger disposed in a first conduit for providing a first heated air flow, a second conduit for a second air flow, an opening between said first and second conduits for merging said first and second air flows in a merging region, a common air channel for said merged air flows, a first mixer structure disposed in the first conduit for controlling the first heated air flow, the first mixer structure having an outlet region, an air inlet for receiving said first heated air flow and a plurality of air passages disposed between the outlet region and the air inlet for dividing said first heated air flow at said inlet region into plural air flows into said outlet region, a second mixer structure having a plurality of wall portions defining a plurality of first air passages disposed between the outlet region of the first mixer structure and the merging region and a plurality of second air passages disposed between said second conduit and said merging region, each of said first air passages being intercalated between a respective pair of said second air passages, wherein the first air flow is mixed with the second airflow in the merging region.

* * * * *